April 17, 1962 R. D. RUPERT 3,029,702
HERMETICALLY SEALED REFLECTOR
Filed June 20, 1960
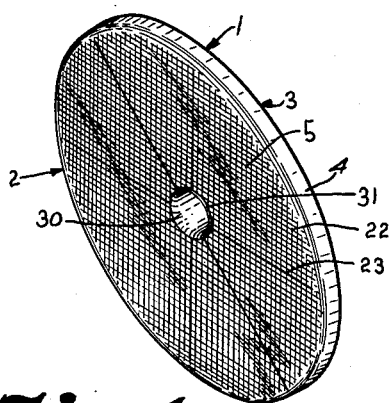
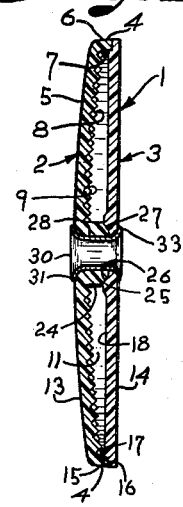
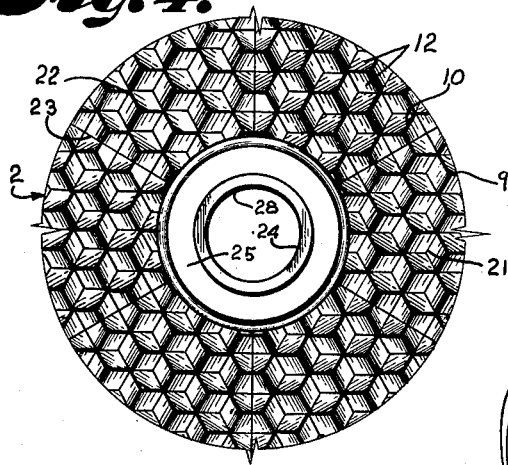
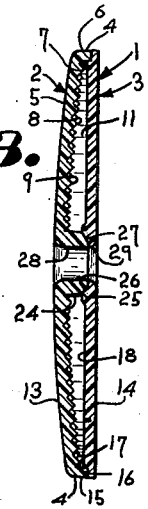
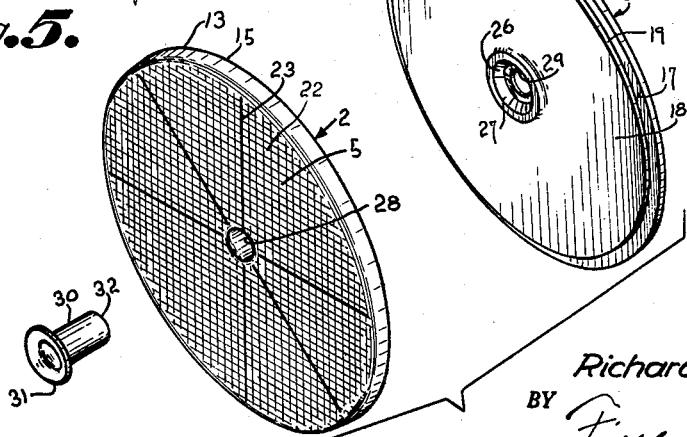
INVENTOR.
Richard D. Rupert.
BY Fishburn and Gold
ATTORNEYS.

United States Patent Office 3,029,702
Patented Apr. 17, 1962

3,029,702
HERMETICALLY SEALED REFLECTOR
Richard D. Rupert, Independence, Mo. (% Rupert Manufacturing Co., Inc., 405 S. 10th St., Blue Springs, Mo.)
Filed June 20, 1960, Ser. No. 37,235
4 Claims. (Cl. 88—78)

This invention relates to reflecting devices, and more particularly to reflecting devices having solid transparent reflector portions which are constructed to reflect light impinging thereon from a distant source back to the general direction of the light source irrespective within limits of the angle of instance of the impinging light. Still more particularly, the invention relates to reflecting devices of such character molded from synthetic resin material with a closure secured to the back of the reflector in sealed relation to protect the reflecting face of the reflector member.

Solid transparent reflecting devices having a series of reflecting units with reflecting surfaces arranged relatively at approximate right angles and in a circuit about the axis thereof have been used at points of danger to reflect beams of light to apprise approaching persons of the danger point or other location. It is common practice for such reflecting devices to have spherical front faces and with rear faces having a plurality of prismatic formations with highly polished surfaces in proper angular relation to form substantially optically true congruent trihedral angles. In solid transparent reflecting devices having highly polished reflecting surfaces on the rear faces, dust, condensation or coatings collecting or deposited on such polished reflecting surfaces materially reduce reflecting efficiency of the device. Therefore, closure members have been applied to cover the rear portion of the reflector plate or disc with a seal at the peripheral marginal portions to protect the highly polished reflecting surfaces and keep same free of deposits of dust, condensation and the like. A reflector device having a rear closure hermetically sealed at peripheral marginal portions to protect the highly polished reflecting surfaces and keep same free of deposits of dust, condensation and the like. A reflector device having a rear closure hermetically sealed at peripheral marginal portions in a manner to eliminate checking of polished surfaces by solvents or warpage, distortion and the like that would result from externally applied heat to seal same is disclosed in the Rupert Patent No. 2,884,835 issued May 5, 1959, on "Double Face Reflector." However, the provision of an axial hole or other mounting means receiving aperture in such reflector devices would provide an opening for passage of dust, condensation and the like for collection on the highly polished reflecting surfaces, and thereby reduce or destroy the benefit obtained from the peripheral seal.

The principal objects of the present invention are to provide a hollow reflecting device with an aperture extending therethrough with portions defining the aperture hermetically sealed to cooperate with a peripheral seal to keep dust, condensation and the like from reflecting units within the hollow sealed space; to provide a reflector structure having two cylindrical plates with concentric ribs or ring portions on one plate hermetically sealed to the other to form a hollow hermetically sealed space defined by the plates and the concentric ring portions; to provide such a reflecting device with circular discs or plate members having peripheral flanges and complementary engaging surfaces on a ring portion concentric with the peripheral flange and spaced inwardly therefrom that are relatively rotated whereby the friction between the complementary surfaces heats and softens same, then the rotation is stopped and the members pressed together to unite the heated portions to form hermetic seals for the inner and outer margins of the hollow structure; to provide such a reflector device wherein the reflecting units are arranged in areas within the space between the peripheral flange and the concentric ring portion; to provide such a structure where the engaging faces at the peripheral margins and the engaging faces of the ring portions are complementary with said faces of the ring portions being frusto-conical for facilitating seal by frictional heat and pressure; and to provide a reflector device with reflector units enclosed in a hermetically sealed space that is economical to manufacture and capable of long life with continuous maximum efficiency and power of reflection due to the protected polished reflecting surfaces of the reflecting units.

Other objects and advantages of this invention will become apparent from the following description taken in connection with the accompanying drawings wherein are set forth by way of illustration and example certain embodiments of this invention.

FIG. 1 is a perspective view of a reflecting device embodying the features of the present invention.

FIG. 2 is a transverse sectional view through the reflecting device.

FIG. 3 is a transverse sectional view through the reflecting disc and cover with faces to be joined substantially contacting.

FIG. 4 is an enlarged detailed rear view of a central portion of the reflecting member.

FIG. 5 is a disassembled perspective view of the parts of the reflecting device before uniting same.

Referring more in detail to the drawings:

1 designates a hollow reflecting device embodying the features of the present invention, preferably circular in form and having disc-like walls 2 and 3 which merge at their margins in a peripheral wall 4. The disc-like wall 2 preferably has a smooth outer face 5 which may be plane, convex or concave. However, in the illustrated structure, the face 5 is convex and substantially spherical. The peripheral wall or flange 4 extends rearwardly or oppositely from the face 5 relative to the disc wall 2 and has an outer surface 6 and an inner surface 7 and the disc-like wall 2 has an inner or rear face 8 provided with formations 9 to form reflecting units 10 whereby said wall 2 forms a solid transparent reflecting member. The reflecting units are disposed in a hollow space 11 between the disc-like walls 2 and 3, said space 11 being hermetically sealed whereby no moisture, dust or other material may enter the space and be deposited on the reflecting surfaces 12 of the reflecting units 10.

The hollow reflecting device 1 is made up of two discs 13 and 14 which are preferably molded or pressed from suitable thermoplastic resin which may be clear or of desired colors, with the disc-like member 14 being translucent or opaque, as desired. The wall 2 of the disc 13 terminates at its margin in a peripheral flange 15 extending rearwardly relative to the face 5 with the rear face 16 of the peripheral flange preferably flat and perpendicular to the axis of the disc 13, the face 16 being spaced from the rear faces or apices of the reflecting units 10 which are on the rear face of the wall 2. The rear face 16 of the peripheral flange 15 is preferably complementary to a marginal peripheral surface 17 on the forward face of the disc member 14 and, in the illustrated structure, the surface 17 is offset from the inner or front face 18 of the body of the disc 14 forming a shoulder 19 adapted to engage the inner surface of the flange 15 in rearwardly spaced relation to the formations 9 whereby the shoulder and flange provide cooperating guide surfaces, the face 18 being spaced from the reflecting units or formations 9, as illustrated in FIG. 3. In the illustrated structure, the face 5 is convex and the reflecting formations 9 conform generally to the contour of the front face of the wall 2. The back or rear of the wall 2 of the reflecting member or disc 13 has a series of prismatic reflecting units 10 of the central triple reflector type thereon, and the axes of the reflecting units are parallel. Generally, the reflector units 10 are each of the character in which a series of reflecting surfaces 12 are arranged relatively at approximate right angles and in a circuit around the reflector unit axis so that light entering the front face of the reflecting member 13 from a distant source will impinge on the reflecting surfaces of the units 10 and will be successively reflected by said surfaces 12 about the axis and back in the general direction of the light source. The units are arranged whereby perimeters thereof are defined by the outer extremities of the surfaces 12 of each unit and form, in effect, a hexagonal aperture or area 21 through which light originating in front of the unit and directed toward the front face passes to the reflecting surfaces.

The prismatic formation of the reflecting member, in the illustrated structure, is divided into a plurality of adjacent areas 22 by radial lines 23. The division lines are six in number forming six equal circular sector areas or groups of reflecting units 10 with the reflecting units 10 and surfaces 12 thereof arranged and oriented as shown and described in the Rupert Patent No. 2,676,518 whereby the reflecting units in any one group have the same orientation and also the reflecting units in alternate groups have the same orientation. The reflecting units 10 in diametrically opposite groups have opposed orientation.

The reflecting member or disc 13 has a ring-like formation or rib 24 spaced inwardly from and concentric with the peripheral flange 15. Said ring portion or rib extends rearwardly from the reflector wall 2 and terminates in an end surface 25 which is complementary to a corresponding surface 26 engaged thereby on the disc member 14. In the illustrated structure, the complementary surfaces 25 and 26 are frusto-conical with the surface 26 being in a recess 27 extending rearwardly from the front face 18 of the member 14. The ring portion 24 defines an aperture 28 which registers with an aperture 29 in the member 14 and cooperates therewith to provide a through axial bore in the reflecting device 1.

With the reflecting member 13 pressed or molded, as described, whereby the surfaces 12 of the reflecting units are highly polished and flat, and with the closure member 14 pressed or molded as described, and each preferably being formed of thermoplastic resin, the members 13 and 14 are placed with the closure member at the rear of the reflector member 13, and with the complementary faces 16 and 17 and 25 and 26 substantially in contact whereby said frusto-conical surfaces engage and center the members 13 and 14 relative to each other. Then the reflecting member 13 and the closure member 14 are held and relative rotation imparted thereto with said faces 16 and 17 and faces 25 and 26 substantially in contact, the relative rotation being at a speed whereby the contact of the faces will create a friction and heating of the portions of the flange 15 and ring member 24 and the closure member immediately adjacent said contacting faces to a softening temperature of the resin. Then the rotation is stopped and pressure immediately applied to the members 13 and 14 both adjacent the peripheries and at the center portions to force same together with sufficient force whereby the softened portions of the flange and concentric ring portion of the reflecting member 13 at the contacting faces with the closure member 14 will unite or weld together in a homogeneous hermetically sealed structure. The pressure is maintained until the heated area is cooled and hardened or cured.

A tubular member 30 preferably of metal has one end spun or formed outwardly to form an annular flange 31. The other end 32 is inserted through the aligned apertures 28 and 29 and then said other end 32 spun or flanged outwardly to create a flange 33 engaging the closure member and drawing the flange 31 into tight engagement with the reflecting member 13 adjacent the apertures therethrough whereby said tubular member and flanges form metallic members to receive suitable fastening devices and the like for mounting the reflecting device on suitable supports. The holding of the reflector member 13 and the closure 14 and relative rotation thereof may be performed by any suitable machine wherein the member holding the rotated part can be rotated and also moved axially, as, for example, the operation may be performed on a drill press with the closure member held stationary in a fixture and the reflector member 13 held by a suction cup or other device to the rotating spindle, and, after relative rotation sufficiently to create heat softening the contacting portions of the reflector and closure plate, the spindle is moved toward the fixture and the spindle quickly stopped as by suitable brake whereby pressure is applied to force the reflector device in tight contact with the closure plate for welding the softened portions. The softening temperature, of course, depends upon the resin used, and the person holding the handle for moving the spindle axially to maintain engagement during rotation has a certain feel caused by the pressure that will indicate by change in said feel when suitable softening has been obtained for proper welding and hermetically sealing of the face 16 to the face 17 and the face 25 to the face 26 to not only have a hermetically sealed cavity in which the reflecting units are located but also to provide the concentric ring portions or flanges defining the inner and outer extremities of said cavity and provide for an aperture within the inner or smaller of the concentric rings without adversely affecting the hermetic seal of the cavity.

It is to be understood that while I have illustrated and described one form of my invention, it is not to be limited to the specific form or arrangement of parts hereindescribed and shown except insofar as such limitations are included in the claims.

What I claim and desire to secure by Letters Patent is:

1. A device of the character described comprising, two circular plates coaxially arranged, radially spaced inner and outer concentric ring portions on one of said circular plates and extending therefrom and having surfaces engaging complementary surfaces of the other circular plate, said ring portions defining inner and outer limits of a cavity between said circular plates, the engaging complementary surfaces of the outer ring portion and said other circular plate being substantially flat and in a plane perpendicular to the axis of said circular plates, the engaging complementary surfaces of the inner ring portion and said other circular plate being surfaces of revolution with contours differing from said outer complementary surfaces, the engaging complementary surfaces of the ring portions and said other circular plate being formed of thermoplastic resin with said complementary surfaces welded together across the areas of said engaged complementary surfaces by frictional heat created by relative axial rotation with said complementary surfaces engaged to simultaneously soften same and then pressure at said softened surfaces to form an integral homogeneous bond hermetically sealing said complementary surfaces together to define a hollow structure with a closed cavity defined by said circular plates and concentric ring portions, said circular plates having a through axial bore within the inner of said concentric ring portions.

2. A device of the character described comprising, two circular plates coaxially arranged, a peripheral flange on one circular plate and extending therefrom forming a recess in the rear of the respective circular plate, said peripheral flange and the other circular plate both having engaging portions formed of thermoplastic resin with registering flat marginal surfaces in a plane perpendicular to the axis of the circular plate, and a ring portion on one of said circular plates and extending therefrom in inwardly spaced concentric relation to the peripheral flange, said concentric ring portion and the other circular plate both having frusto-conical engaging portions formed of thermoplastic resin with registering complementary surfaces on said frusto-conical portions, said marginal surfaces on the peripheral flange and the other circular plate and the complementary surfaces on the frusto-conical portions being welded together across the areas of said engaged marginal and complementary surfaces by frictional heat created by relative axial rotation with said registering flat marginal surfaces and said complementary surfaces respectively engaged to soften same and then uniform pressure at said softened surfaces to form an integral homogeneous bond hermetically sealing said marginal surfaces and complementary surfaces respectively together whereby the peripheral flange and ring portion in the circular plates define a hollow structure with a closed cavity defined by said circular plates and the peripheral flange and concentric ring portion.

3. A reflecting device comprising, two circular plates coaxially arranged, one of said circular plates having formations on the face thereof adjacent the other circular plate and forming reflecting areas, a peripheral flange surrounding the reflecting area on said one circular plate and extending therefrom forming a recess in the rear of the respective circular plate, said peripheral flange and the other circular plate both having engaging portions formed of thermoplastic resin with registering flat marginal surfaces spaced from the formations on the face of the reflecting area and in a plane perpendicular to the axis of the circular plate, and a ring portion on one of said circular plates and extending therefrom in inwardly spaced concentric relation to the peripheral flange, said concentric ring portion and the other circular plate both having frusto-conical engaging portions formed of thermoplastic resin with registering complementary surfaces on said frusto-conical portions spaced from the formations on the face of the reflecting area, said marginal surfaces on the peripheral flange and the other circular plate and the complementary surfaces on the frusto-conical portions being welded together across the areas of said engaged marginal and complementary surfaces by frictional heat created by relative axial rotation with said registering flat marginal surfaces and said complementary surfaces respectively engaged to soften same and then uniform pressure at said softened surfaces to form an integral homogeneous bond hermetically sealing said marginal surfaces and complementary surfaces respectively together whereby the peripheral flange and ring portion in the circular plates define a hollow reflecting structure with a closed cavity defined by said circular plates and said peripheral flange and concentric ring portion.

4. A reflecting device comprising, two circular plates coaxially arranged, one of said circular plates having formations on the face thereof adjacent the other circular plate and with polished surfaces on said formations forming reflecting areas, a peripheral flange surrounding the reflecting area on said one circular plate and extending therefrom forming a recess in the rear of the respective circular plate, said peripheral flange and the other circular plate both having engaging portions formed of thermoplastic resin with registering flat marginal surfaces spaced from the formations on the face of the reflecting area and in a plane perpendicular to the axis of the circular plate, a ring portion on one of said circular plates and extending therefrom in inwardly spaced concentric relation to the peripheral flange, said concentric ring portion and the other circular plate both having frusto-conical engaging portions formed of thermoplastic resin with registering complementary surfaces on said frusto-conical portions spaced from the formations on the face of the reflecting area, said marginal surfaces on the peripheral flange and the other circular plate and the complementary surfaces on the frusto-conical portions being welded together across the areas of said engaged marginal and complementary surfaces by frictional heat created by relative axial rotation with said registering flat marginal surfaces and said complementary surfaces respectively engaged to soften same and then uniform pressure at said softened surfaces to form an integral homogeneous bond hermetically sealing said marginal surfaces and complementary surfaces respectively together whereby the peripheral flange and ring portion in the circular plates define a hollow reflecting structure with a closed cavity defined by said circular plates and said peripheral flange and concentric ring portion, said circular plates having an axial bore therethrough within the ring portion, and a tubular member extending through said bore and having outwardly extending annular portions at the ends thereof engaging the exterior of said circular plates adjacent said bore.

References Cited in the file of this patent

UNITED STATES PATENTS

| | | |
|---|---|---|
| 2,690,094 | Becker | Sept. 28, 1954 |
| 2,703,773 | Stimson | Mar. 8, 1955 |
| 2,798,478 | Tarcici | July 9, 1957 |
| 2,884,835 | Rupert | May 5, 1959 |
| 2,942,748 | Anderson | June 28, 1960 |